Patented June 13, 1950

2,511,480

UNITED STATES PATENT OFFICE 2,511,480

POLYPEROXIDE CATALYSTS IN ETHYLENE POLYMERIZATION

Milton J. Roedel, Wilmington, Del., assignor to E. I. du Pont de Nemours & Company, Wilmington, Del., a corporation of Delaware No Drawing. Application November 29, 1944, Serial No. 565,811

6 Claims. (Cl. 260—94.9)

1

This invention relates to improvements in the catalytic polymerization of organic compounds containing olefinic unsaturation.

It is known that ethylene and other monoolefins can be polymerized with the aid of catalysts such as oxygen, dialkyl dioxides, acyl peroxides, chloramine T, manganese dioxide, amine oxides, tetraphenyltin, tetraethyl lead, butyl lithium, hexachloroethane, etc.

This invention has as an object to provide a new and improved method for polymerizing organic compounds containing at least one polymer-producing linkage. Another object is to provide a new process for polymerizing organic compounds containing monoolefinic unsaturation. Still another object is to provide a new process for polymerizing monoolefinic hydrocarbons alone and in admixture with other polymerizable organic compounds containing monoolefinic unsaturation. Further objects reside in the provision of a class of catalysts for the polymerization of ethylene alone and in admixture with other organic compounds containing monoolefinic unsaturation to produce polymers having the valuable properties hereinafter described. Other objects will appear as the description proceeds.

The above objects are accomplished by conducting the polymerization at elevated temperatures and pressures in contact with an organic polyperoxide as a catalyst.

The expression "organic polyperoxide" refers to compounds containing two or more peroxy linkages, —O—O—, and which are obtained by reacting, under peroxide-forming conditions, either a ketone or aldehyde, or a mixture of two ketones or a mixture of two aldehydes. A typical method for preparing these organic polyperoxides is described in Alien Property Custodian application S. N. 307,933, filed December 6, 1939, now abandoned. A polyperoxide from acetone and methyl ethyl ketone is made as follows:

About 163 cc. of concentrated sulfuric acid is added to 130 cc. of water and after the mixture has cooled down to room temperature 113 g. of hydrogen peroxide of 30% concentration is added. The mixture is then cooled to approximately —18° C. and a mixture of 36 g. of methyl ethyl ketone and 29 g. of acetone is added in portions while stirring, care being taken that the temperature of the mixture does not rise above 0° C. After addition of the ketones the mixture is allowed to stand for about 15 minutes and then water is added until the total volume is 1 liter, whereupon a colorless, viscous upper layer separates. This layer is freed of acid and any traces

2 of unconverted ketones by washing with water, dried over sodium sulfate, and filtered. The product can be further purified by steam distillation although this step is not essential for the practice of this invention.

As previously indicated, the polyperoxides of this invention can be made from any suitable ketone, mixture of ketones, from any aldehyde and mixtures of aldehydes, and from mixtures of aldehydes and ketones. Examples of ketones and aldehydes are acetone, methyl ethyl ketone, methyl isopropyl ketone, cyclohexanone, mesityl oxide, diacetyl, acetyl acetone, diphenylketone, benzoin, acetaldehyde, propionaldehyde, butyraldehyde, cyclopentaldehyde, benzaldehyde, furfural, glyoxal, methyl glyoxal, acetylbenzaldehyde, and the like.

The organic compounds containing a polymer producing linkage used in the process of this invention include those having carbon-oxygen unsaturation and which are known to be polymerizable, such as carbon monoxide, formaldehyde and the like, and those having carbon-to-carbon unsaturation of the ethylenic type, namely, >C=C<. Examples of these polymerizable organic compounds containing monoolefinic unsaturation include ethylene, propylene, the butylenes, tetrafluoroethylene, vinyl fluoride, vinylidene fluoride, vinyl chloride, vinyl acetate, vinyl propionate, vinyl benzoate, vinyl isobutyrate, vinyl thiolacetate, vinyl dimethyl and trimethyl acetates, vinyl laurate, vinyl hexenoate, and other organic vinyl esters, vinylidene chloride, vinyl ketones, e. g., methyl vinyl ketone, ethyl isopropenyl ketone, etc., styrene, acrylic and methacrylic acids and their esters, nitriles, amides and anhydrides, etc., N-vinyl imides, e. g., N-vinyl phthalimide, N-vinyl succinimide, etc.

In the practice of this invention as a batch operation, a suitable reaction vessel is charged with a non-polymerizable organic liquid medium and the desired organic polyperoxide, containing a plurality of peroxy groups. The vessel is closed, placed in a heated shaker machine, and connected to a source of organic compound containing a polymer producing linkage, and recording thermocouples are inserted into the vessel. The desired organic compound containing a polymer-producing linkage is added to the reaction vessel and heating and agitation are started. Upon reaching reaction temperature, or after a short period of induction, the reaction starts and is normally followed by a pressure decrease due to utilization of the organic compound containing a polymer-producing linkage. The pressure within the system is maintained throughout the reaction period either by addition of fresh organic compound containing a polymer-producing linkage or by decreasing the free space in the reactor by increasing the volume of the medium. When reaction is complete, as evidenced by cessation of pressure drop, the vessel is cooled, bled of excess gas, opened and the reaction mixture discharged. The polymer is isolated from the reaction mixture by means well known to the art, e. g., by filtering and drying. The polymer is usually in a satisfactory form but it may be purified by washing on a mill, by solvent extraction, by means of steam distillation, drying, etc. When the products are liquid hydrocarbons, they may be purified by steam distillation, fractional distillation, treatment with decolorizing agents, etc., if desired.

A modification of the above process includes polymerizing the organic compound containing a polymer producing linkage, e. g., ethylene with another polymerizable organic compound containing monoolefinic unsaturation, e. g., propylene or vinyl acetate. The organic compound to be polymerized with the ethylene can be added with the catalyst, or, if it is a gas at normal temperatures and pressures, it may be expanded from pressure storage tanks into the closed reaction vessel prior to or after pressuring with ethylene, or it may be added in admixture with the ethylene.

The proportion of organic compound containing a polymer producing linkage charged into the reaction vessel can be varied over a wide range. Control of this variable can be had either by varying the pressure in the reaction vessel, by varying the ratio of liquid charge to the free space in the reactor, by varying the reaction temperature, or by a combination of these.

As a rule, the amount of catalyst will range from about 0.001% to about 5% of the total weight of monomer charged into the reaction vessel. It is preferred, however, to use as small an amount of catalyst as possible as this has an effect on the molecular weight of the polymer obtained. As a rule, the catalyst concentration will range from about 0.1% to about 2% of the total monomer or monomers charged into the reactor.

The practice of this invention is illustrated by the following examples in which parts are by weight unless otherwise specified.

Example 1

A stainless steel pressure reactor is flushed with oxygen-free nitrogen and charged with 88 parts of anhydrous benzene and 0.35 part of a benzene solution of the heteropolyperoxide obtained by reacting equimolar proportions of acetone and methyl ethyl ketone and which contains 2.86% peroxide, calculated as hydrogen peroxide. This charge occupies about 25% of the volume of the reactor. After removal of the nitrogen by evacuation to constant pressure, the reactor is charged with ethylene to a pressure of 165 atmospheres and heated to 125° C. Upon reaching this temperature the ethylene pressure is raised to 500–600 atmospheres and the polymerization is allowed to proceed with agitation for an 18-hour period. As the ethylene polymerizes, the system is kept between 500 and 600 atmospheres pressure by the addition of more ethylene. The total pressure drop during the 18-hour reaction period is about 600 atmospheres. The reactor is then cooled and the excess ethylene is bled off. There is obtained 62 parts of a white solid ethylene polymer having an intrinsic viscosity of 0.76 (measured as a 0.125% solution in xylene at 85° C.), which corresponds to a molecular weight of about 13,400. This ethylene polymer is tough, contains an inappreciable quantity of grain, is very soluble in hot xylene, and can be melt extruded readily.

Example 2

A stainless steel pressure reaction vessel is flushed with oxygen-free nitrogen and charged with 88 parts of benzene and 0.1 part of the acetone-methyl ethyl ketone heteropolyperoxide prepared from a mixture of equal molar portions of acetone and methyl ethyl ketone. The charge occupies about 25% of the reactor space. After removal of the nitrogen by evacuation to constant pressure, the reactor is charged with ethylene to a pressure of 160 atmospheres and heated to 125° C. Upon reaching this temperature the ethylene pressure is raised to 850 to 950 atmospheres and the polymerization is allowed to proceed with agitation for a 14-hour period. As the ethylene polymerizes the system is kept between 850 and 950 atmospheres pressure by periodically repressuring with ethylene. A total pressure drop of about 620 atmospheres is observed. The reactor is cooled and the excess ethylene is bled off. There is obtained 41 parts of white solid tough ethylene polymer which possesses a tensile strength of 3,720 lbs./sq. in. at 480% elongation, a tear resistance of 111 (cellophane units), and a solubility in excess of 20% by weight in xylene at 100° C. The intrinsic viscosity of the polymer is 1.22 (measured as a 0.125% solution in xylene at 85° C.), which corresponds to a molecular weight of about 22,000.

Example 3

A stainless steel pressure reactor is flushed with oxygen-free nitrogen and charged with 88 parts of anhydrous benzene and 1.8 parts of a benzene solution of a polyperoxide obtained by reacting a mixture of equal molar portions of acetone and cyclohexanone with a hydrogen peroxide-sulfuric acid mixture and which contains 2.41% peroxide, calculated as hydrogen peroxide. This charge occupies about 25% of the volume of the reactor. After evacuation of the reactor to constant pressure, the reactor is charged with ethylene to a pressure of 260 atmospheres and heated to 120° C. Upon reaching this temperature the pressure is raised to 850–950 atmospheres and the polymerization is allowed to proceed with agitation for a 13-hour period. As the ethylene polymerizes the system is kept at 850–950 atmospheres pressure by periodically repressuring with ethylene. The total pressure drop is about 350 atmospheres. The reactor is cooled and the excess ethylene is bled off. There is obtained 24 parts of a white solid ethylene polymer which has an intrinsic viscosity of 1.28 (measured as a 0.125% solution in xylene at 85° C.), which corresponds to a molecular weight of about 23,300. This polymer has a tensile strength of 3,250 lb./sq. in. at 490% elongation.

Example 4

A stainless steel pressure reactor is flushed with oxygen-free nitrogen and is charged with 88 parts of anhydrous benzene and 0.2 part of 3,6-diphenyl-s-tetroxane

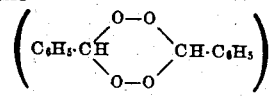

This charge occupies about 25% of the reactor volume. After removal of the nitrogen by evacuation to constant pressure, the reactor is charged with ethylene to a pressure of 50 atmospheres and heated to 200° C. Upon reaching this temperature the ethylene pressure is raised to 850–950 atmospheres. The polymerization is then allowed to proceed with agitation for an 18-hour period. Throughout this period of reaction the pressure within the reactor is maintained at 850–950 atmospheres by periodically repressuring with ethylene. The total pressure drop is about 160 atmospheres. The reactor is cooled, and the excess ethylene is bled off. There is obtained 26 parts of a white solid ethylene polymer having an intrinsic viscosity of 0.89 (measured as a 0.125% solution in xylene at 85° C.), which corresponds to a molecular weight of about 15,800. This polymer is tough, possessing a tensile strength of 2,263 lb./sq. in at 620% elongation, is relatively free of grain, and is very extrudable possessing an extrusion rate of 1.376 g./min./190° C./100 lb. nitrogen pressure through a $\frac{1}{16}$" orifice.

Example 5

A. *Catalyst preparation.*—Thirty grams concentrated sulfuric acid is added to 13 g. distilled water and the solution is cooled to 25° C. 11.3 g. hydrogen peroxide is added and the mixture is cooled to −30° C. A mixture of 2.9 g. acetone and 3.6 g. methyl ethyl ketone is added slowly with stirring while the temperature is maintained below −15° C. 100 g. distilled water is added followed by 87 g. benzene. The layers are separated and the oil layer is washed with water until free from acid and ketones. Analysis of the oil layer indicates a peroxide content of 1.2% calculated as hydrogen peroxide.

B. *Polymerization in benzene.*—4.4 g. per hour of the catalyst solution prepared above is dissolved in 8.6 lbs./hr. benzene and the resulting solution is pumped to approximately 60 atms. pressure and mixed with 3.8 lbs./hr. ethylene at the same pressure. The mixture is passed through a cooler and pumped at 1000 atms. pressure through a tubular preheater and thence, through a tubular reactor 17.5 ft. long and $\frac{1}{16}$" I. D. Jackets on both preheater and reactor are maintained at 160° C. The reaction mixture is continuously removed from the reactor and is released by means of a control valve to a separator at essentially atmospheric pressure wherein unreacted ethylene and a portion of the benzene are separated as a gaseous phase. Most of the remaining benzene is steamed from the solid product and the latter is dried yielding 0.12 lb./hr. corresponding to an ethylene conversion of 3.2%.

Example 6

A. *Catalyst preparation.*—The procedure described in Example 5 is essentially duplicated except that 10% more hydrogen peroxide is used. Analysis of the catalyst solution indicates a peroxide content of 1.9% calculated as hydrogen peroxide.

B. *Polymerization in water-benzene.*—Two streams are continuously injected into the reactor. The first consisting of 30 g. per hour of the above catalyst solution, 8.5 lbs./hr. of benzene and 9.35 lbs./hr. ethylene is mixed and pumped to 1000 atms. pressure as described in Example 5 and is preheated to 90° C. The second stream consisting of 21 lbs./hr. water is pumped to 1000 atms. and preheated to 244° C. The two streams are mixed and passed through a tubular reactor 49 ft. long and $\frac{1}{16}$" I. D. with jacket maintained at 200° C. The reaction mixture is let down to essentially atmospheric pressure by means of a control valve and the gaseous phase consisting of unreacted ethylene together with benzene and water vapor is separated. Excess water is removed from the wet solid product and the latter is dried yielding 4.4 lbs./hr. dry product corresponding to 47% ethylene conversion.

In some instances it may be desirable to replace the organic medium by water or to use a mixture of water and an organic solvent such as benzene. Suitable organic media in addition to benzene include isooctane, toluene, alcohols, such as tert.-butyl alcohol, ethers, etc.

Bulk polymerization in the absence of an inert medium may also be employed. It is preferable to use reagents as pure as is commercially feasible. In general, the process is operated under conditions such that the molecular oxygen content of the ethylene is less than 1000 parts per million with 200 parts per million being preferred and under 20 parts per million giving attractive products.

The present invention provides a class of catalysts for the polymerization of ethylene and other compounds containing monoethylenic unsaturation which can be easily prepared and used in small quantities and offer no serious purification problems. They are effective over a wide range of temperatures and pressures and are active in the presence of a variety of materials.

The organic polyperoxides used in the practice of this invention, are operable at temperatures which may be as low as 60° C. and as high as 400° C. It is generally preferred, however, to operate at temperatures in the range of 120° to 250° C. and pressures in excess of atmospheric. In general, pressures in excess of 4 atmospheres can be used but the usual pressures employed are in the range of 200 to 3000 atmospheres.

As a rule, the use of higher pressures permits the use of lower temperatures. The particular conditions of temperature and pressure in any one case are determined not only by the particular organic polyperoxide used but also by the material being polymerized. Temperatures and pressures are interdependent variables and the conditions for optimum results in any one instance have to be determined experimentally.

The present organic polyperoxide catalysts do not have induction periods, are rapid and enduring in their activity, and the limit of their effectiveness is reached only when the free space in the reactor is completely occupied with products so that no more monomer or monomers can be introduced. In view of this fact it is usually advantageous to employ these catalysts in a continuous polymerization system from which the products are removed continuously. Such a continuous process may be exemplified by passage of the whole polymerization mixture through a reaction zone maintained under appropriate polymerizing conditions or by passing the reactants separately through a mixing chamber, then through a reaction zone or by pumping the reactants separately through a reaction zone and introducing the catalyst in solution or suspension immediately prior to entering the reaction zone. In a continuous process the catalyst solution or suspension can be introduced at intermediate stages throughout the reaction zone, since by this means the heat developed in any one portion of the apparatus is rapidly dissipated and consequently the polymerization can be carried through to a desired high molecular weight product. The present process is exothermic in character, and, as in any process where the amount of heat to be removed is large, a continuous process permits greater precision in control and consequently more uniformly excellent results.

The catalysts of this invention are operable in the absence of agitation but in many instances good agitation is conducive to good yields of polymer.

The products of this invention are useful for hot-dipped and melt-spray application, for conversion to wrapping foils, films, fibers, monofils, electrical and thermal insulating materials, rigid and collapsible tubing, filaments, protective coatings, and for many other purposes well known to the art.

The term "polymer" is used herein in a generic sense to refer to the macromolecular products obtained by polymerizing one or more organic compounds containing a polymer producing linkage.

I claim:

1. In a process involving the polymerization of ethylene at a temperature between 60 and 400° C. and at a pressure between 200 and 3000 atmospheres, the step which comprises conducting the polymerization in the presence of a heteropolyperoxide from acetone and a different ketone.

2. In a process involving the polymerization of ethylene at a temperature between 60 and 400° C. and at a pressure between 200 and 3000 atmospheres, the step which comprises conducting the polymerization in the presence of a catalyst of the group consisting of the polyperoxides from acetone and methyl ethyl ketone and from acetone and cyclohexanone.

3. In a process involving the polymerization of ethylene at a temperature between 60 and 400° C. and at a pressure between 200 and 3000 atmospheres, the step which comprises conducting the polymerization in the presence of a heteropolyperoxide from acetone and methyl ethyl ketone.

4. In a process involving the polymerization of ethylene at a temperature between 60° and 400° C. and a pressure between 200 and 3000 atmospheres, the step which comprises conducting the polymerization in the presence of from about 0.001 to 5% of a heteropolyperoxide from acetone and methyl ethyl ketone based on the total weight of monomers charged into the reactor.

5. In a process involving the polymerization of ethylene at a temperature between 60 and 400° C. and at a pressure between 200 and 3000 atmospheres, the step which comprises conducting the polymerization in the presence of a heteropolyperoxide from acetone and cyclohexanone.

6. A process for the preparation of extrudable polymers of ethylene which comprises polymerizing ethylene at a temperature between 100 and 250° C. at a pressure between 200 and 3000 atmospheres, in the presence of a polyperoxide from acetone and cyclohexanone and a non-polymerizable inert organic liquid medium.

MILTON J. ROEDEL.

REFERENCES CITED

The following references are of record in the file of this patent:

UNITED STATES PATENTS

| Number | Name | Date |
|---|---|---|
| 2,115,207 | Milas | Apr. 26, 1938 |
| 2,200,429 | Perrin | Mar. 14, 1940 |
| 2,334,195 | Hopff | Nov. 16, 1943 |
| 2,378,195 | D'Alelio | June 12, 1945 |
| 2,424,851 | Rudoff | July 29, 1947 |

OTHER REFERENCES

Reiche: "Die Bedeutung der Organishen Peroxyde, etc.," Sammlung Chem. u. Chem-Tech. Vortrage; Neue Folge, 34, pages 10 and 11 especially (1936).

Ser. No. 307,933, Moser (A. P. C.), published June 15, 1943.